United States Patent [19]

Hoffman

[11] Patent Number: 4,791,459
[45] Date of Patent: Dec. 13, 1988

[54] PIN REGISTER VACUUM SYSTEM

[76] Inventor: Morris Hoffman, 19 Grand Ave., Farmingdale, N.Y. 11735

[21] Appl. No.: 143

[22] Filed: Jan. 2, 1987

[51] Int. Cl.$^4$ ............................................. G03B 27/20
[52] U.S. Cl. ....................................... 355/91; 354/275
[58] Field of Search ................... 355/91, 93, 94, 79, 355/73, 76; 354/275, 276

[56] References Cited

U.S. PATENT DOCUMENTS

| | | | |
|---|---|---|---|
| 2,173,168 | 9/1939 | Hughes | 355/91 |
| 3,146,690 | 9/1964 | Hoffman | 355/73 X |
| 3,221,596 | 12/1965 | Hoffman | 355/73 |
| 3,237,543 | 3/1966 | Hoffman | 354/276 |
| 3,551,048 | 12/1970 | Hoffman | 355/73 |
| 3,625,611 | 12/1971 | Orr et al. | 355/91 X |
| 3,771,870 | 11/1973 | Taylor | 355/91 |
| 4,433,910 | 2/1984 | Tarsia | 355/76 |

Primary Examiner—Richard A. Wintercorn
Attorney, Agent, or Firm—James P. Malone

[57] ABSTRACT

Pin register vacuum systems. A vacuum holder for holding film in a camera. Two pins are located near one end of the holder to locate film having corresponding holes. A first spring is mounted on one side of the holder. A second spring is mounted on one end of the holder. Vacuum is applied to hold the film flat in the holder. A vacuum register glass carrier for the enlarger and a vacuum register platen for enlarging are provided.

17 Claims, 2 Drawing Sheets

PIN REGISTER VACUUM SYSTEM

TECHNICAL FIELD

This invention relates to vacuum systems for cameras and enlargers, and a process for super imposing images on film.

More particularly, the invention comprises a vacuum film holder carrier and vacuum platen for achieving special effect photography by super imposing the additional images onto film having a first image by using masks or other masking film to block certain areas and to insert other images into these areas.

PRIOR ART

This invention is an improvement of my prior Patents. U.S. Pat. Nos. 3,146,690; 3,221,596; 3,237,543 and 3,551,048.

BACKGROUND

In this process, it is required that the film be kept absolutely flat in the carrier or vacuum platen and be kept in perfect register because many different images are to be put into the same piece of film by masking. The photographer starts doing this creative work by doing it in his large format view camera. The camera must be maintained in absolute rigid placement and the carrier to be inserted into the camera must always go into the camera at the same precise location. The film that goes into the holder is in the precise location in the holder, when the holder is inserted into the camera. Because of the various areas which may be masked on the film to present other images, it is required that the film carrier be removed as many times as masking is necessary.

There are many instances that the photographer cannot complete all his imaging onto the film by just using his camer, for instance, putting in words of type or graphs or other images which he may use enlarged, or reduced. To do so he projects these images down to a vacuum platen.

The carrier film in the enlarging mode, projects down an image, and must go over a pin registration system, and where the platen is also in a fixed position since two pieces of film of the same size of which are a color film and the other one is a mask to hold back an area for each mask.

In the process of making these masks, first the mask is placed over the film to get the area that is to be blocked out. It is then made into a reversal so that an image can be placed into the correct clear area onto the film so as to receive the other image. This process is repeated for as many masks to superimpose all the images required for that completion of the special effect photography onto the film.

THE INVENTION

The invention comprises a vacuum film holder with two 0.062 pins located near the loading end of the holder with dark slide light shield as in my prior U.S. Pat. Nos. 3,257,543; 3,221,596 and 3,146,690 or carrier where the film is inserted at the bottom of the holder. A spring pressure device is at one side of the holder to force the holder to go into the camera, always to one side. A second spring is located at the bottom of the holder which when the holder is inserted into the camera, it forces the holder, which has a ridge on top of the holder, to drop into the recess in the camera back to locate itself at that one fixed point in a precise position, thereby making this setup a precision alignment and this eliminates any need to modify the camera back.

When a sheet of film has to be punched at the bottom for registration which goes over the pins in the vacuum holder, one can also punch on the opposite side and also along the long side two holes and then flip the film over and punch two more holes on the long side. This gives the film two holes top and bottom and four holes on each side. When a sheet of masking film is punched with just the two holes to fit over the color film underneath, by this means the vacuum will go through the holes and place the top masking film also under vacuum. In the vacuum holder there are holes directly under the holes in the color film. THis makes for suction of the top masking film.

Another version of film holder or carrier is made in the same manner as the vacuum film holder, which has an opaque vacuum chamber inside, whereas this new unit contains a clear glass vacuum insert which will hold a piece of film flat against the glass on one side which will be in the optical film plane for sharpness and the mask is in front of it on the other side of the glass. The sheet of film on each side of the glass is held down in vacuum.

This permits a soft edge to be produced in the masks. This same method is used in the enlarger carrier where the mask and the film are kept both in contact against each side of the glass in vacuum and in pin registration.

In the method for the film carrier for the enlarger, the film must be kept always flat and in register.

In the standard film carrier supplied for the enlarger to keep film flat, the film is sandwiched between two pieces of glass. The problems with the two pieces of glass and especially the bottom piece of glass requires constant cleaning and replacing when scratched. This problem arises with the bottom glass that the film lies on, since the image must project through this glass. Also, the bottom glass can cause color shift, distortion and newton rings due to the pressure.

In this invention, a sheet of glass is so grooved to permit vacuum suction to go around the inner edge of the film to vacuum flat to the glass. The film lies on the underside of the glass which is facing the lens. By extneding holes through the glass to the other side, a second sheet of film can lie on the top of the glass such as a mask or color gell to create a special effect by projection.

OBJECTS OF THE INVENTION

A principal object of the invention is to provide new and improved film holders.

Another object of the invention is to provide means and methods for masking and super-imposing images on film.

Another object of the invention is to provide means and methods for masking and super-imposing images on film with perfect registration.

Another object of the invention is to provide new and improved vacuum holder for holding film in a camera comprising: two pins located near one end of the holder to locate film having corresponding holes, a first spring mounted on ones side of the holder, a second spring mounted on one end of the holder, and means to apply vacuum to hold the film flat on the holder.

Another object is to hold a second film in vacuum which is a mask which lies on top of the first film in the vacuum holder by means of having holes punched around the perimeter of the first sheet of film allowing suction to the second top sheet.

Another object is to provide a film carrier for the enlarger which contains a vacuum surface made of glass to hold film flat and in register.

Another object of this invention is to provide a dual action vacuum easel which by its combination of features permits the holding in vacuum a number of same size sheets. The location of pins for other sizes to be permanently installed in the vacuum board without interferring with the other pins for the smaller size film.

BEST MODE OF THE INVENTION

WHen projecting down with an enlarger onto a vacuum platen it is required that this vacuum board have means of being firmly mounted to the baseboard it is essential that the vacuum board not be moved once positioned. Therefore, suction underneath the board prevents movement per FIG. 3, and contains two or more 0.062" round pins. The nature of this particular type of invention encompasses a dual action vacuum easel which has a vacuum underneath the board and vacuum on the face of the board which holds the material in pin registration. In this method of operation, it is required that two sheets of film of the same size be kept under vacuum. This is achieved by using an overlay sheet of a larger size of plastic or acetate which contains a window in this overlay. The overlay is larger than the two sheets of film which is in pin registration. An example is as follows: When using two 8"×10" sheets of film, one is the color film and the other is the Kodalith mask. It is understood that there is no way you can put under vacuum two or more sheets of film of the same size. But, by using a larger overlay of an 11"×14" size on an 11"×14" vacuum board and this 11"×14" overlay has a cut out window which is approximately ¼" smaller overall all around. The approximate size of the opening is about 7½"×9½". This size extends into the film area of the sheets, one on top of the other. When the vacuum is activated for the 8"×10" and the 11"×14", the two sheets of film and the overlay are brought under vacuum at the same time.

In the use of the vacuum board, there are many instances where the need to use 4"×5" film, 8"×10" film and 11"×14" film with masks instead of having a two pin registration system for each size film, a common two pin system for the smaller size such as the 4"×5", thereby the 4"×5" film, the 8"×10" film and the 11"×14" film when punched for the two holes will go over the same two pins at one common edge. A separate overlay window is made for each size to hold each two films of the same size under vacuum. The vacuum board has a valve selector to give vacuum for each individual size to maximum size, per U.S. Pat. No. 3,551,048.

This invention of this vacuum board combines a dual action vacuum easel with a common location for two pins for many sizes to hold other sizes for two sheets of the same size with a cut out overlay window which will hold everythin under vacuum.

Figure 1:
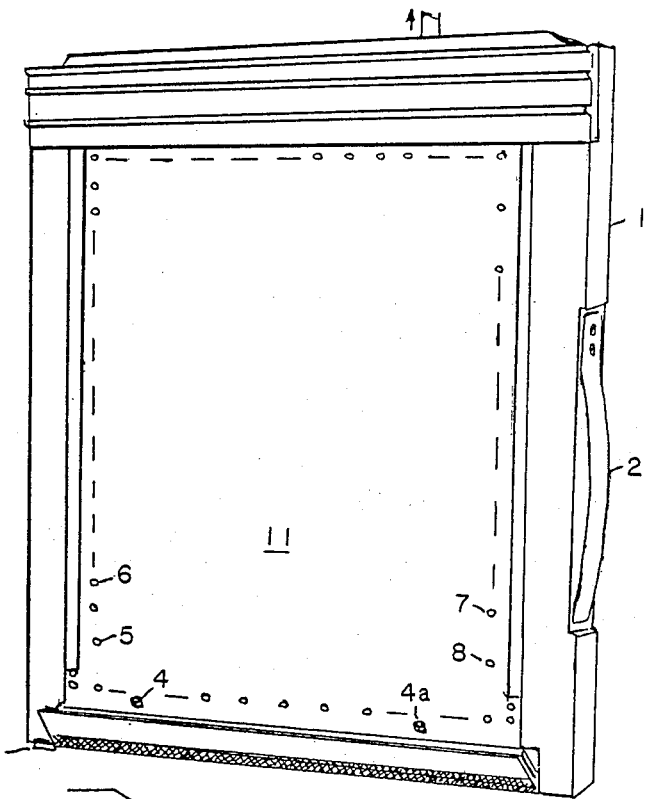
FIG. 1 is a front view illustrating the vacuum film holder with the springs on the side and the bottom.

FIG. 1 illustrates the vacuum film holder 1, with the springs 2 and 3 on the side and the bottom. Register pins 4, 4a, etc. are mounted on the holder. Vacuum holes 5, 6, 7, 8, etc. extends around all sides of the platen 11.

Figure 2:
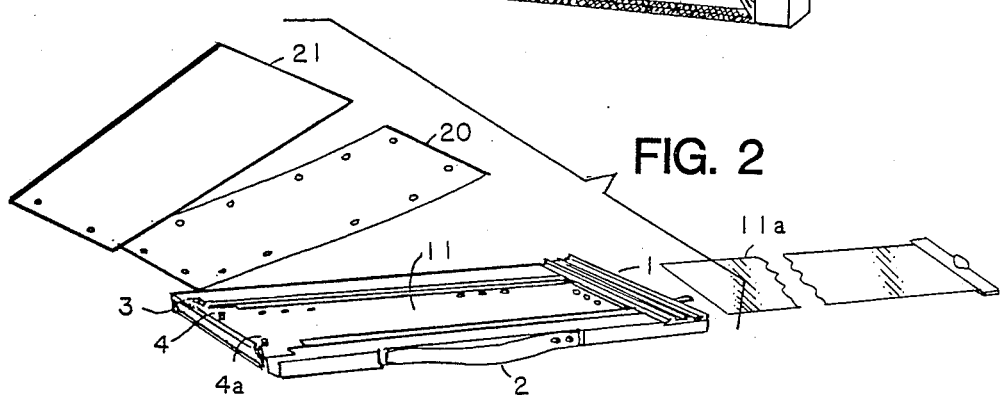
FIG. 2 is an exploded view showing the holder, a color film and a masking film.

Referring to FIG. 2, when a sheet of film 20, is punched at the bottom for registration which goes over the pins in the vacuum holder, one can also punch on the opposite side and also along the long side two holes and then flip the film over and punch two more holes on the long side. This gives the film two holes top and bottom and four holes on each side. When a sheet of masking films 21, is punched with just the two holes to fit over the color film underneath, the vacuum will go through the holes and place the top masking film also under vacuum. In the vacuum holder there are holes directly under the holes in the color film. This makes for suction on the top masking film 21. Conventional dark slide is adapted to be inserted in conventional manner as shown in my U.S. Pat. Nos. 3,237,543; 3,221,596 and 3,146,690.

Figure 3:
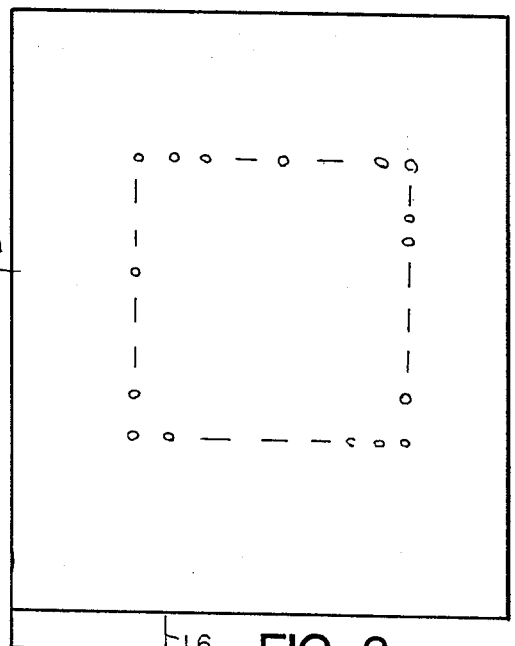
FIG. 3 is a bottom view which illustrates the vacuum source underneath the board.

FIG. 3 illustrates the vacuum source connected to the valve 16, which is connected to the platen 11a, which is under 11, per U.S. Pat. No. 3,551,048, FIG. 3.

Figure 4:
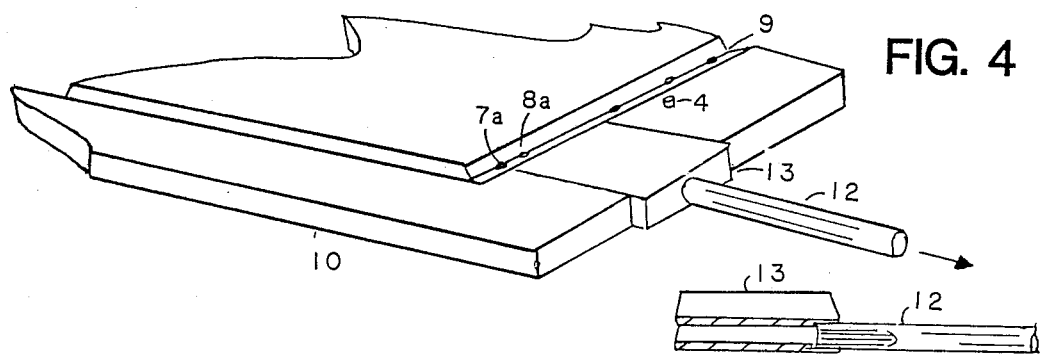
FIG. 4 is a perspective view which shows the glass for the vacuum glass holder and vacuum platen for film carrier for the enlarger.

FIG. 4 shows the glass plate 10, for the vacuum glass holder and film carrier for camera and enlarger. This view shows the holes 7a, 8a, going through the glass platens so that vacuum is possible on both sides from the one side which has a groove 9.

Figure 5:
FIG. 5 is a side partly sectional view which shows the tube connecting fitting which fits flush over the glass.

FIG. 5 shows the tube 12 connecting fitting 13 which fits flush over the glass plate 10.

Figure 6:
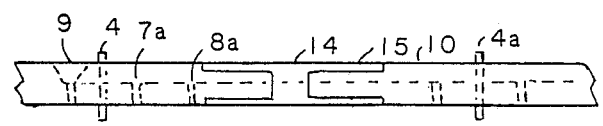
FIG. 6 is a sectional view which illustrates the glass's vacuum air chamber and the glass cutout porting section for the metal tube connection to be installed.

FIG. 6 illustrates the vacuum air entry chamber 14 for the glass plate and the glass cutout portion 15 for the metal or plastic tube connection to be installed. Registers pins 4 and 4a extend through the glass where required and through holes 7a, 8a, etc.

Figure 7:
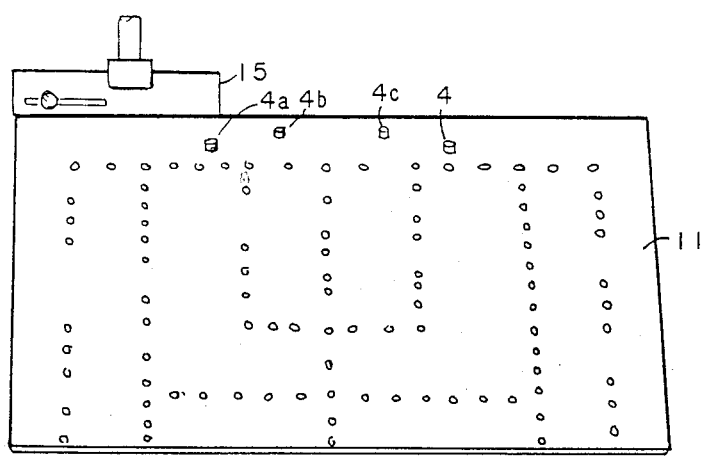
FIG. 7 is a perspective which shows the vacuum easel or platen with valve selector and variety of pins permanently installed in board.

FIG. 7 shows the vacuum platen 11 with vacuum valve selector 15 and pins 4, 4a, 4b and 4c, etc., installed in the platen 11. These pins are so located from the one common surface so that they do not conflict with each other. The concept herein is to work from one common banking surface for all the film sizes to be used to put under vacuum. This will permit a series of pins to be permanently installed where any film sizes to be put down will not interefere with the pins in the same area for the other film sizes. The largest film has a pair of pin holes which are closest to the vacuum hole line. For the next smaller size film, the pair of pins are located just at the edge of the previous larger size film. Therefore, this permits numerous pins to be located premanently in the board. By positioning the stem in the valve selector in the OFF position and the vacuum pump activated, this creates a vacuum underneath the board to permanently hold the board to the baseboard of the enlarger as shown in FIG. 3.

Figure 8:
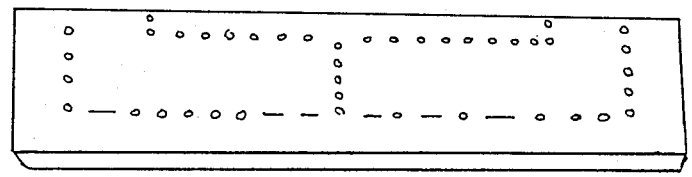
FIG. 8 is a perspective view which illustrates the overlay sheet.
Figure 8:
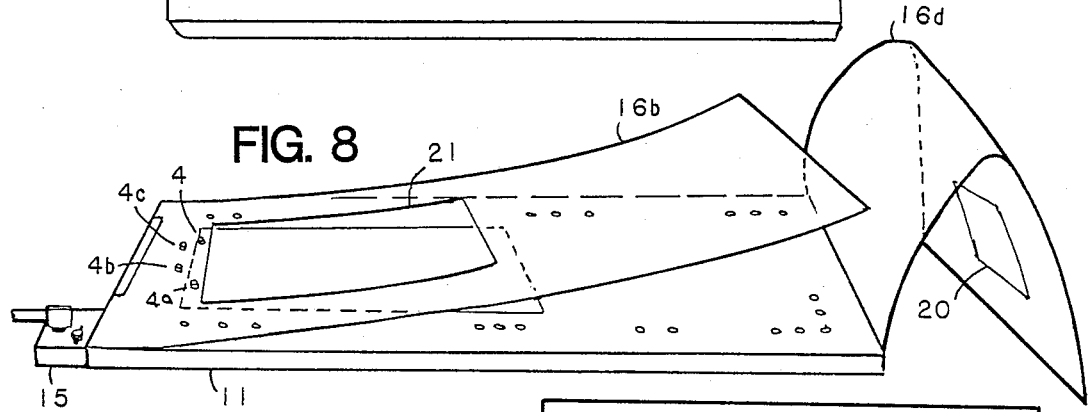

FIG. 8 illustrates the overlay sheetss 16a, 16b, which are hinged at one end so that the plastic sheet remains in a permanent position. More than one overlay sheet with windows 20 and 21, can be used in different locations around the perimeter of the board on all four sides as necessary for the various different film sizes required.

Figure 9:
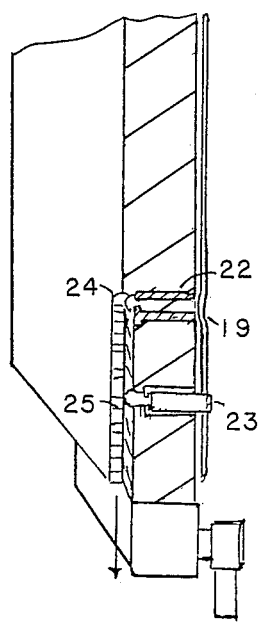
FIG. 9 is a perspective view of the vacuum board.

FIG. 9 illustrates a modification whereby if the vacuum board is required to acommodate larger than 1/16" diameter pins such as the Kodak register punch or others which are ¼" pins and the customer wishes to use the board not only for film but wants to use it as an easel for color enlarging on paper without registration. The pins 23, therefore have to be removable. This requires that these pins be inserted into bushings 22, to maintain their precise location and the pins to be removable. These holes are quite large and the vacuum board being under total vacuum, causes any material 19, that is not under vacuum to dimple into the hole. To relieve this situation of the dimpling, a through hole 24, must be created through the board exiting underneath the board and a channel 25, grooved to the outside of the board which therefore eliminates the dimpling of 19 into the paper or film that lays over the open hole which is necessary because of the suction contact of the vacuum board to the baseboard of the enlarger.

It is claimed:

1. An open face vacuum holder with dark slide light shield for holding film under vacuum and will fit into any view camera comprising:
   two pins located near one end of the holder to register the film having corresponding holes,
   a first spring mounted on one side of the holder to force the holder to bank to the one side,
   a second spring mounted on one end of the holer,
   and means to apply vacuum to hold the film flat on the holder.

2. Apparatus as in claim 1 wherein the holder has a locating ridge adjacent to the second bottom spring and the camera back has corresponding channel to receive said ridge to index the holder in the proper position in camera.

3. A vacuum holder for holding film in all cameras comprising two pins located near one end of the holder to locate film having corresponding holes, permitting a number of vacuum holders with dark slides to be inserted in as many cameras as required, by the precise location of the two pins from the inside of the holder to the outside of the holder banking surface and from the pins to the outside ridge on the top of the holder for every holder,
   a first spring mounted on one side of the holder to force the holder to proper position relative one side,
   a second spring mounted on one end of the holder,
   and means to apply vacuum to hold the film flat on the holder, the holder having a locating ridge adjacent to the bottom spring.

4. Means to make a number of masks by removing the holder or using additional holders and super-imposing images on the original color film achieve the effect desired, comprising:
   a film, a mask,
   two pins located near one end of the holder to register the film having corresponding holes,
   a first spring mounted on one side of the holder to force the holder to proper position relative one side,
   a second spring mounted on one end of the holder,
   and means to apply vacuum to hold the film flat on the holder.

5. Apparatus as in claim 4, having a vacuum glass carrier with the glass vacuum platen which can be inserted in any carrier for one side vacuum use and means by spring pressure device to register carrier in any enlarger.

6. Apparatus as in claim 5 having a vacuum platen with holes to produce vacuum on both sides of the glass to fit any enlarger carrier.

7. Apparatus as in cliam 5, having register pins mounted into the glass adn the same pins extending trhough both sides of the glass vacuum plates, permitting it to fit any enlarger carrier.

8. Means to mask and super-impose images on film comprising:
   a vacuum holder,
   a film, a mask
   two pins located near one end of the holder to locate the film and mask having corresponding holes,
   a first spring mounted on one side of the holder,
   a second spring mounted on the bottom end of the holder,
   and means to apply vacuum to hold the film flat in the holder, wherein the mask which lies on top of the first film in the vacuum holder is held in suction by means of having holes punched around the perimeter of the first sheet of film allowing suction to the second top sheet.

9. Means to mask and super-impose images on film comprising:
   a vacuum holder,
   a film, a mask
   two pins located near one end of the holder to locate the film and mask having corresponding holes,
   a first spring mounted on one side of the holder,
   a second spring mounted on the bottom end of the holder,
   and means to apply vacuum to hold the film flat in the holder, the vacuum holder having a glass chamber for two sided use.

10. Means to mask and super-impose images on film comprising:
    a vacuum holder;
    a film, a mask
    two pins located near one end of the holder to locate the film and mask having corresponding holder,
    a first spring mounted on one side of the holder,
    and means to apply vacuum to hold the film flat in the holder, including a vacuum glass carrier.

11. Apparatus as in claim 10 having a vaccum glass platen with holes to produce vacuum on both sides of the glass.

12. A vacuum platen,
    means to provide suction underneath the platen,
    permanently arranged register pins in the platen, and
    means to hold two or more sheets of different size film under vacuum on the surface of the platen, having an overlay window in an overlay sheet to suction down a number of same size sheets of film.

13. A vacuum platen,
    means to provide suction underneath the platen,
    permanently arranged register pins in the platen, and
    means to hold two or more sheets of different size film under vacuum on the surface of the platen, having means to hold in vacuum a number of different size sheets of film and having reigster pins for larger size film permanently installed in the vacuum board without interfering with the other pins for the smalle size film.

14. A vacuum platen,
means to provide suction underneath the platen permanently arranged
register pins in the platen, and means to hold two or more sheets of
different size film under vacuum on the surface of the platen, having holes through the platen so that vacuum is obtained on top of the platen and all films kept in pin register from one banking surface at one end of platen.

15. Apparatus as in claim 12, having two or more sheets of film in vacuum and holding two or more different size sheets and means to use additional overlay windows and means to apply vacuum to the overlay window sheets in order to place all under vacauum in pin register for each size.

16. A vacuum platen,
means to provide suction underneath the platen, permanently arranged
register pins in the platen, and means to hold two or more sheets of
different size film under vacuum on the surface of the platen, having
means to avoid dimpling of papers or film comprising means to vent a
register pin bushing hole causing the dimpling under suction and
having means when the vacuum platen is also to be used as an enlarging easel to hold in vacuum, photographic photo paper or film for pin and non-pin registration use, whereby the pins are removable and bushings may be installed which would then accept the removable pins for register use.

17. Apparatus as in claim 16
having means to avoid dimpling of paper or film when register pins are removed, comprising means to vent the register pin bushings holes and having a grooved channel to exit to the outside from the underside of the vacuum platen to prevent the dimpling under suction.

* * * * *